Patented May 16, 1944

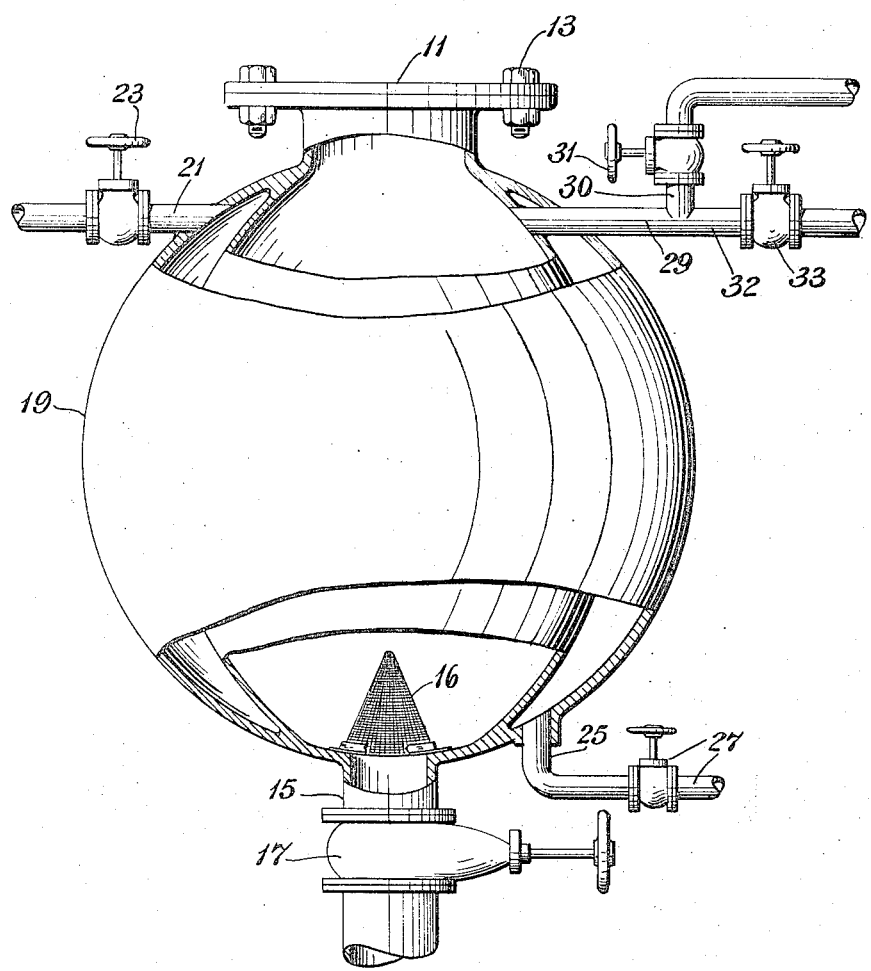

2,348,751

UNITED STATES PATENT OFFICE 2,348,751

TREATMENT FOR POLYAMIDES

Wesley Rasmus Peterson, Wilmington, Del., assignor to E. I. du Pont de Nemours & Company, Wilmington, Del., a corporation of Delaware Application August 2, 1940, Serial No. 350,021

8 Claims. (Cl. 260—78)

This invention relates to the recovery of synthetic linear polyamides, and more particularly it relates to the degradation of synthetic linear polyamides.

The term "synthetic linear polyamide," as used throughout the following specification and claims, designates, specifically, the new class of fiber-forming synthetic linear polyamides described in Carothers U. S. patents, Nos. 2,071,250, 2,071,253 and 2,130,948. These polyamides are of two main types; those obtainable from monoaminocarboxylic acids and their amide-forming derivatives, including caprolactam and those obtainable from suitable diamines and dibasic carboxylic acids. Also contemplated are interpolymers containing amide groups, such as esteramides. In these linear polyamides, the amide groups occur as linkages in the main chain of atoms.

Synthetic linear polyamides have been used heretofore in the production of filaments, yarns, sheets, films, coating and adhesive compositions and other useful articles. The production of articles from synthetic linear polyamides involves the accumulation of considerable polyamide waste material. In view of the cost of preparing synthetic linear polyamides, it is particularly desirable to recover the synthetic linear polyamides from accumulated polyamide waste as well as from articles comprising the polyamides.

Although it might be expected that such waste material might be recovered by melting and reforming into the desired article from the melt, this is not practical on a large scale. The polyamides above their melting points are quite viscous and it is very difficult to obtain uniform blending of various scraps. Furthermore, it is practically impossible to remove all of the occluded and trapped oxygen from the scrap material. Consequently, the recovery of scrap by remelting would result in a very badly discolored product since the molten material is very readily attacked by oxygen with resulting discoloration. Also, because of the voluminous character of waste yarn (as well as other waste articles), it is very difficult to effect the transfer of heat to the yarn for the purpose of remelting it. This latter characteristic would result in other difficulties such as requiring the maintenance of a larger quantity of the material in the molten state (thus causing more rapid decomposition of the material and variations in physical and chemical properties attendant thereon) and the necessity for larger equipment or more frequent charging of the equipment.

It is, therefore, an object of this invention to provide a method of recovering synthetic linear polyamides from articles comprising them.

It is a further object of this invention to provide a method for obtaining fiber-forming synthetic linear polyamides from scrap material comprising polyamides.

It is a further object of this invention to provide a method for preparing solutions of fiber-forming synthetic linear polyamides from synthetic linear polyamide structures, said solutions having an average molecular weight below that of the parent material.

It is a further object of the invention to provide a method whereby the properties of synthetic linear polyamides may be modified for dyeing and other purposes.

It is a further object of the invention to treat polyamide articles so that their properties are affected by partial hydrolysis.

Other objects of this invention will hereinafter become apparent.

The objects of this invention are accomplished, in general, by heating synthetic linear polyamide waste or articles comprising synthetic linear polyamides in the presence of water or steam until degradation of the polyamide to a fluid mass occurs. The fluid may be used as such or the water may be removed and the residue polymerized until a polymer of the desired properties is obtained. The degradation of the polyamide does not involve complete hydrolysis to the monomer but rather partial hydrolysis to a fluid state under the temperature and pressure conditions of the containing vessel.

The invention may be more easily understood by reference to the accompanying drawing when taken in connection with the following detailed description.

The accompanying drawing is a front elevational view of an autoclave construction, constructed of stainless steel or other suitable material, suitable for use in accordance with the present invention.

With reference to the autoclave construction shown in the drawing, reference numeral 11 designates a closure member for the top of the autoclave. The closure member 11 may be fastened tightly to the autoclave by means of bolts 13. A conduit 15 is connected to the bottom of the autoclave, the conduit being provided with a shut-off valve 17 for regulation of the flow of material from the autoclave. A conical screen may be positioned to surround the outlet at the bottom of the autoclave. The autoclave is provided with a heating jacket 19. An inlet conduit 21 for a heating medium is connected to the heating jacket 19. The conduit 21 is provided with a valve 23 for control of the heating medium passing to the heating jacket. An outlet conduit 25 is connected to the heating jacket for withdrawal of the heating medium. The outlet conduit 25 is provided with a control valve 27. A conduit 29 is connected to the interior of the autoclave. This conduit 29 is provided with branch conduits 30 and 32 which branch conduits are provided respectively with valves 31 and 33. Conduit 32 may be connected to means for the creation of a vacuum to withdraw any air from the autoclave, and the conduit 30 may be connected to a source of nitrogen, or other inert gas, which may be passed into the autoclave at any desired pressure.

The apparatus disclosed in the drawing is adapted to operate as follows: Bolts 13 are removed and the cover plate 11 swung to one side so that a certain amount of distilled water and a quantity of waste synthetic linear polyamide may be charged into the autoclave. The cover plate 11 is then placed in a closed position and bolts 13 inserted and tightened in place. The valve 33 is now opened and a source of vacuum connected with the interior of the autoclave. After the gases have been substantially evacuated from the autoclave, valve 33 is closed and valve 31 is opened permitting nitrogen gas to flow into the interior of the autoclave. If desired the autoclave may be alternately flushed with nitrogen and evacuated several times. Both valves 31 and 33 are then closed. An alternative method of purging may be used, if desired, using steam or some other suitable vapor or gas instead of nitrogen. Valve 23 in conduit 21 is then opened and a quantity of a heating medium such as steam or Dowtherm vapors permitted to flow into the heating jacket 19. Condensed heating medium may be withdrawn through conduit 25 and valve 27. After the heating jacket reaches the desired temperature, the quantity of heating medium flowing into the jacket is adjusted to maintain the desired temperature. After heating the distilled water and synthetic linear polyamide waste in the autoclave for the proper period of time to cause a depolymerization of the polyamide to the point where the depolymerized material is liquid, the molecular weight is found to be lower than that of the parent material. The solution may be extruded at this point to yield a finely divided product, subdivision being caused by the flashing off of the superheated water. Alternatively, the polymer may be repolymerized by opening the valve 33 permitting a gradual bleeding of steam from the autoclave. After the water in the autoclave has all been removed through valve 33, the valve is again closed and the heating in the autoclave continued until the depolymerized material has again been polymerized to form the synthetic linear polyamide of the desired intrinsic viscosity. During the step of polymerization the autoclave is heated to a temperature sufficiently high to obtain the polymerized synthetic linear polyamide in the molten state. The molten synthetic linear polyamide is then removed from the autoclave by opening valve 17 and forcing the polyamide to flow through the screen 16 and conduit 15. If desired, the conduit 15 may be provided with a round or slit-like orifice and thereby cause the polyamide to be extruded in the form of a rod or ribbon. If desired, the molten polyamide may even be extruded directly from the autoclave in the form of yarn or monofils or film.

The molten synthetic linear polyamide may be pumped from the autoclave, or alternatively may be forced from the autoclave by pressure of nitrogen passed into the autoclave through valve 31 and conduits 30 and 29.

The following examples are given to illustrate certain specific embodiments of the present invention, it being understood that the invention is not to be limited thereto.

EXAMPLE I

Three hundred and thirty-nine grams of waste polyhexamethylene adipamide yarn were washed with a 10% aqueous soap solution and rinsed thoroughly with water. This yarn was then charged together with 110 grams of water into an autoclave. The autoclave was alternately evacuated and flushed with $N_2$ several times to remove air and then closed at atmospheric pressure and heat was applied. In approximately two hours the temperature had reached 290° C. and the pressure 300 pounds per square inch. Water vapor was thereafter bled from the autoclave to prevent the pressure from increasing and the heating was then continued for twenty minutes after which the rate of bleeding was increased to lower the pressure 15 pounds per square inch per minute until all the water vapor had been removed. The autoclave was then put under 50 pounds per square inch nitrogen pressure and the heating continued. It was then evacuated to remove bubbles and finally cooled. The fiber-forming polyhexamethylene adipamide obtained had an intrinsic viscosity (as defined in Carothers U. S. Patent No. 2,130,948) of 0.83.

EXAMPLE II

Twenty-five pounds of waste polyhexamethylene adipamide yarn was charged into an autoclave together with 22 pounds of water and the autoclave evacuated to remove air. Heat was then applied. After about an hour the pressure had reached 25 pounds per square inch, thirty minutes later it had reached a pressure of 120 pounds per square inch, and thirty minutes later it had reached a pressure of 250 pounds per square inch. During the next two hours the heating was continued and the water vapor bled off at a sufficient rate to maintain the pressure at 250 pounds per square inch. At the end of this period the temperature was 270° C. The temperature was then held constant and the rate of bleeding increased so that at the end of an hour and a half the pressure had been reduced to atmospheric pressure. The molten polymer was then extruded in the form of a rough ribbon directly into cold water and cut into small chips or flakes. These flakes were then dried, blended with freshly made polymer, charged into a melt spinning apparatus where it was melted and spun in the form of a multifilament yarn.

EXAMPLE III

Thirty pounds of off-color scrap, polyhexamethylene adipamide polymer was charged into an autoclave together with 15 pounds of water and 135 grams of a slurry of the salt produced by reaction of hexamethylene diamine and adipic acid, and carbon black (ratio 4 parts salt to 1 part carbon black), and 240 grams of lauric acid. The autoclave was then heated as described in Example II and the polymer produced was extruded, cut, etc. The chips were then used for the melt spinning of bristles.

EXAMPLE IV

After thoroughly purging free from oxygen, three hundred grams of polyhexamethylene adipamide yarn are heated with six hundred grams of water at 210° C. in an autoclave for one hour. At the end of this time the yarn has dissolved in the superheated water to form a homogeneous solution of polymer having a molecular weight much lower than that of the yarn (giving less viscous solutions). This solution is extruded into air, under which conditions the water flashed off, yielding the polyamide in a finely divided form, useful for blending with pigments.

EXAMPLE V

Five parts of waste polyhexamethylene adipamide yarn, 5 parts of hexamethylene diammonium sebacate (the salt prepared by reacting hexamethylene diamine and sebacic acid), and 10 parts of water are charged into an autoclave. The autoclave is purged free from air and the contents are heated to 250 pounds steam pressure. The polyhexamethylene adipamide becomes depolymerized. Water vapor is then bled at a rate to maintain the pressure at 250 pounds per square inch until the temperature reaches 270° C. The pressure is then gradually reduced to atmospheric pressure while maintaining the temperature at 270° C. and the molten interpolyamide product (an interpolyamide of polyhexamethylene adipamide and polyhexamethylene sebacamide) is extruded and cut into flakes suitable for subsequent melt extrusion.

EXAMPLE VI

Four parts of caprolactam, 6 parts of chopped up polyhexamethylene adipamide yarn, and 10 parts of distilled water are charged into an autoclave. The autoclave is purged free from air and the contents are heated to approximately 250° C. The polyhexamethylene adipamide yarn becomes depolymerized. The mixture of caprolactam and partially hydrolyzed polyhexamethylene adipamide is then repolymerized as described in Example V except that at the end of the cycle the interpolymer is evacuated for a period of two hours while holding at 275° C. The interpolymer is extruded and cut into flakes suitable for subsequent melt extrusion or other processes for producing useful products, such as films, filaments, coatings, etc.

EXAMPLE VII

One hundred twenty-four parts of ethylene glycol, 292 parts of adipic acid, 73 parts of polyhexamethylene adipamide, and 490 parts of distilled water are charged into an autoclave and heated to approximately 210° C. The polyhexamethylene adipamide becomes depolymerized. The ester-amide ingredients are then polymerized as described in the copending application of Merlin Martin Brubaker, Robert Edward Christ, and Donald Drake Coffman, Serial Number 232,685 now Patent No. 2,224,037, and extruded.

EXAMPLE VIII

Fifty parts of waste polyhexamethylene adipamide yarn, 50 parts of waste polyhexamethylene sebacamide yarn, and 100 parts of distilled water are charged into an autoclave. The autoclave is purged free from air. The contents are heated to approximately 210° C. The polyhexamethylene adipamide and polyhexamethylene sebacamide become depolymerized. Repolymerization is carried out as described in Example V. An interpolymer of polyhexamethylene adipamide and polyhexamethylene sebacamide is extruded and cut into flakes suitable for subsequent melt extrusion or other methods of processing to produce filaments, films, coatings, etc.

EXAMPLE IX

A sheet of polyhexamethylene adipamide film is wetted and treated with a hot roll in such a manner as to effect a localized partial hydrolysis of the polyamide. The film is then dyed, producing a novel dyed effect due to the partially hydrolyzed part.

Although the invention has been described above with reference to the use of an autoclave, it is to be understood that any other type of apparatus, in which synthetic linear polyamides may be heated with water at an elevated pressure, will be suitable for use in accordance with the present invention.

The autoclave, or other type of heating apparatus may be heated in any desired manner, for example, by steam, by electrical heating elements, by Dowtherm (a mixture of diphenyl and diphenyl ether) or the like. The steam for heating the yarn in the autoclave may be generated in the autoclave or it may be passed thereto from any other source.

The ratio of waste yarn, or other source of polyamide to be depolymerized, to water which has been found to work best in the recovery of synthetic linear polyamides is 1:1. However, the above-mentioned ratio of waste yarn to water is not to be considered as limitative of the invention. It is only necessary that sufficient water be present to hydrolyze the amide linkages of the polyamide to produce molecules of sufficiently low molecular weight to form a liquid of the mass under the conditions of temperature and pressure existing in the autoclave. The presence of an excess quantity of water will not prevent the operation of the process since the excess water will be bled from the autoclave in the process of repolymerization.

In order to obtain a sufficiently depolymerization of the polyamide, it has been found preferable in the case of polyhexamethylene adipamide that the water and synthetic linear polyamide in the autoclave be maintained at a temperature of between 200° C. and 210° C. for approximately one hour. This temperature range should not be considered as limitative of the present invention, however, for it is possible to degrade the polyamide at any higher temperature as high as 300° C. saturated steam, or higher, but at 300° C. the pressure (1200 pounds per square inch) is about as high as is convenient to use, or at a lower temperature depending on the particular polymer being recovered. Below about 160° C. the rate of depolymerization becomes inconveniently low. One skilled in the art can by experimentation find for each polyamide the lowest temperature at which depolymerization will occur and the optimum temperature at which to carry out the process. The time required for depolymerization at a given temperature, the cost of equipment, operating costs, etc., will enter into the determination of the optimum temperature.

For simplicity and convenience, the invention has been discussed with particular reference to polyhexamethylene adipamide. Nevertheless, it is to be understood that other synthetic linear polyamides may be recovered in a similar manner. Among others, the following simple polyamides may be recovered according to the invention; polyhexamethylene adipamide, polyhexamethylene sebacamide, polydecamethylene adipamide, polydecamethylene sebacamide, polytetramethylene adipamide, polytetramethylene sebacamide, caprolactam polymer, 6-amino-caproic acid polymer, 9-aminononanoic acid polymer, etc. Numerous diamines, such as hexamethylene diamine, decamethylene diamine, tetramethylene diamine, octamethylene diamine, etc., may be added during the recovery process. Various dibasic acids, such as adipic acid, sebacic acid, etc. may be added. Numerous glycols, such as ethylene glycol, propylene glycol, pentaglycol, trimethylene glycol, hexamethylene glycol, decamethylene glycol, etc., may be added to produce polyester-polyamide products. Also, aromatic hydroaromatic or aromatic aliphatic dihydric alcohols may be used for this purpose. The invention is also applicable to other synthetic linear polymers which are capable of being prepared by a condensation reaction with the resultant splitting out of molecules of water (or other small molecules) to form high molecular weight polymers. It is to be understood that degrading liquids other than water, for example methanol, ethanol, glycol and other alcohols may be used to achieve the degradation. Of course, the use of such liquids would require the use of special repolymerization methods in case repolymerization were desired. Also, it is possible in certain cases to use a mixture of such depolymerizing agents with water or other depolymerizing agents. Interpolymers of various kinds may also be recovered in accordance with the principles of this invention. Interpolymers also may be made by recovering two different polymers at once. It is sometimes desirable to prepare a polyamide having a higher viscosity than that of the original waste polyamide. In the case of polymers stabilized with monobasic acids such as acetic acid or dibasic acids such as adipic acid, this may be done by adding a small amount of diamine to the autoclave at sometime during the recovery cycle. By experimentation one skilled in the art can readily determine the quantity of diamine to add in order to produce a polyamide of the desired viscosity. Likewise, in the case of polymers stabilized with monobasic or dibasic amines, dibasic acids may be added to increase the viscosity. Other stabilizers, such as salts of diamines, for example hexamethylene diammonium acetate (the salt of hexamethylene diamine and acetic acid), or monobasic acids or amines such as acetic acid or dodecyl amine, may be added to produce a polyamide of lower viscosity than that of the original waste polyamide.

In Example I a process for cleansing waste yarn was described. It is to be understood that various steps may be necessary in preparing the waste yarn before charging the same into the autoclave depending on the source of the yarn. Soap solutions of various kinds and concentrations may be used for this purpose. Other detergents and cleansing agents may be required. Solvents may be necessary to remove oils, finishes, or other contaminating agents which would not react properly in the autoclave treatment. It is sometimes found that foreign particles such as ring travelers become mixed with the waste yarn. Such objects are usually removed by straining the same through the screen 16 at the bottom of the autoclave.

While the invention has been described particularly with respect to the recovery of waste yarn resulting from occurrences in the manufacture which cause the yarn to be inferior, it should be clearly understood that the invention is not to be limited to the recovery of such yarns. It is possible in accordance with the principle of this invention, to recover polyamide from fabrics of various kinds. For example, stockings prepared from polyhexamethylene adipamide may be subjected to various treatments for removal of substances other than the polyamide, then degraded and remade into polymer, spun into yarn, and knitted into new stockings. Polyamide may be recovered from mixed fabrics or mixed yarns or fibers such as a mixture of cotton and polyhexamethylene adipamide yarns or fibers. The polyamide may be degraded and the fluid mass containing the depolymerized polyamide filters from the cotton. Also, polyamides may be recovered from scrap produced in molding and turning operations. It is to be understood that this invention encompasses the recovery of polyamides from any sources of the polyamides by degradation with steam or water to a fluid state followed, if so desired, by repolymerization to a high molecular weight.

While the invention has been described particularly with regard to recovery of polyamides involving degradation, and in some cases repolymerization, it is to be understood that the process of partial hydrolysis or degradation under pressure in the presence of a degrading liquid may be applied to many types of polyamide articles with the resultant production of utility due to the altered affinity of the degraded (or partially hydrolyzed) part of the article for dyes, finishes, sizes, surface active agents, or other treating agents containing functional basic or acid groups. For example, a certain part of a fabric might be induced to absorb more dye by subjecting that portion of the fabric to a partial hydrolysis under pressure. Other liquids than water may also be used in this type of treatment, for example, alcohols such as methanol, ethanol, glycol, etc.

The polymer recovered in accordance with this invention may contain modifying agents, such as luster-modifying agents, plasticizers, pigments and dyes, anti-oxidants, resins, etc. Such modifying agents may also be added to the autoclave during the recovery process. It is preferred to add the delustering agent, such as titanium dioxide, or other pigments, as a slurry in water to the autoclave at the beginning of the polymerization cycle when all of the polymer-forming materials are present in the autoclave. However, the delustering agent may be incorporated in the polymer at various other points during the preparation of the polymer or the subsequent shaping of it.

Polymers recovered in accordance with this invention may be blended in any proportions with new polymer (that is, polymer prepared from new ingredients, such as a newly prepared polyamide prepared from a fresh batch of a diamine and a fresh bath of a dibasic acid) or likewise in any proportions with other recovered polymers.

This invention makes possible great savings in the manufacture of shaped articles from synthetic linear polymers. Some of the yarn produced in the conventional manufacturing process is inferior because of broken filaments, uneven denier, and other undesirable characteristics. Without this recovery process, this yarn would have to be discarded or sold at exceedingly low prices. In accordance with this invention, it can now be recovered and formed anew into good yarn or other shaped articles such as bristles, fishing lines and leaders, tennis strings, and numerous other useful products. The yarn obtained from the recovered polymer has as good tenacity as does yarn prepared from new polymer.

Moreover, yarn spun from recovered polymer frequently has a much smaller proportion of flecks than yarn spun from the original polymer. A fleck is a type of defect in a filament occurring during spinning in which for a short length (about 1-2 millimeters) the diameter is abnormally high. Synthetic linear polyamide yarns are cold drawn to orient the molecules along the fiber axis. A fleck is more resistant to cold drawing than the adjacent parts of the filament and frequently causes the filament to break at a point immediately adjacent to the fleck during cold drawing. However, yarns having a high proportion of defects due to flecks and a consequent high proportion of broken filaments can be put through the recovery process of this invention with the subsequent production of yarns from the recovered polymer which have a greatly reduced proportion of defects due to flecks. The table illustrates the marked improvement produced in several polyamide yarns recovered using water as the depolymerizing agent.

TABLE

*Average of defects per 1,000 yards of yarn*

| | Polymer | Before recovery | After recovery |
|---|---|---|---|
| 1 | Polyhexamethylene adipamide | 11.2 | 1.0 |
| 2 | ...do... | 11.8 | 1.1 |
| 3 | ...do... | 14.0 | 1.1 |
| 4 | ...do... | 13.8 | 1.1 |

This is a very great advantage; for it has not been heretofore possible to reduce the number of flecks produced by a given polymer. It is very surprising that a process for recovering a waste material results in a product which is superior to the original.

Another great advantage to the process of this invention is the opening up of the great possibilities of recovering the polymer from used articles. The yarn in stockings, for instance, is by no means deteriorated to the point of being useless when the stocking has become unusable as such, for the polymer may be recovered in accordance with the principle of this invention and made into high grade stockings again. These considerations are especially important in view of the high original cost of the ingredients used in preparing the synthetic linear polyamides.

As it is evident that many changes and modifications can be made in the above-described details of this invention without departing from the nature and spirit of the invention, it is to be understood that the invention is not to be limited to these details except as set forth in the appended claims.

I claim:

1. The process which comprises depolymerizing a solid synthetic linear polyamide to a fluid mass by heating the same in the presence of water, removing the water, and polymerizing the residue.

2. The process which comprises depolymerizing a solid synthetic linear polyamide to a fluid mass by heating the same at a temperature below 300° C. in the presence of water, removing the water, and polymerizing the residue.

3. The process which comprises depolymerizing a solid synthetic linear polyamide to a fluid mass by heating the same at a temperature between 160° C. and 300° C. in the presence of water, removing the water, and polymerizing the residue.

4. The process which comprises removing extraneous matter from a synthetic linear polyamide material, depolymerizing said synthetic linear polamide material to a fluid mass by heating the same in the presence of water, removing the water, and polymerizing the residue.

5. The process which comprises alternately subjecting to a vacuum and flushing with nitrogen a synthetic linear polyamide material, depolymerizing said material by heating the same in the presence of water, removing the water, and polymerizing the residue.

6. The process which comprises alternately subjecting to a vacuum and flushing with nitrogen a mass of synthetic linear polyamide material, depolymerizing the polyamide material to a fluid mass by heating the same in the presence of water, bleeding water vapor from said mass, and polymerizing the residue at a temperature sufficiently high to obtain a molten synthetic linear polyamide.

7. The process as defined in claim 1 in which the polymerization of the residue is carried out in the presence of a monobasic acid stabilizer.

8. The process as defined in claim 1 in which the polymerization of the residue is carried out in the presence of acetic acid.

WESLEY RASMUS PETERSON.